Patented Mar. 28, 1944

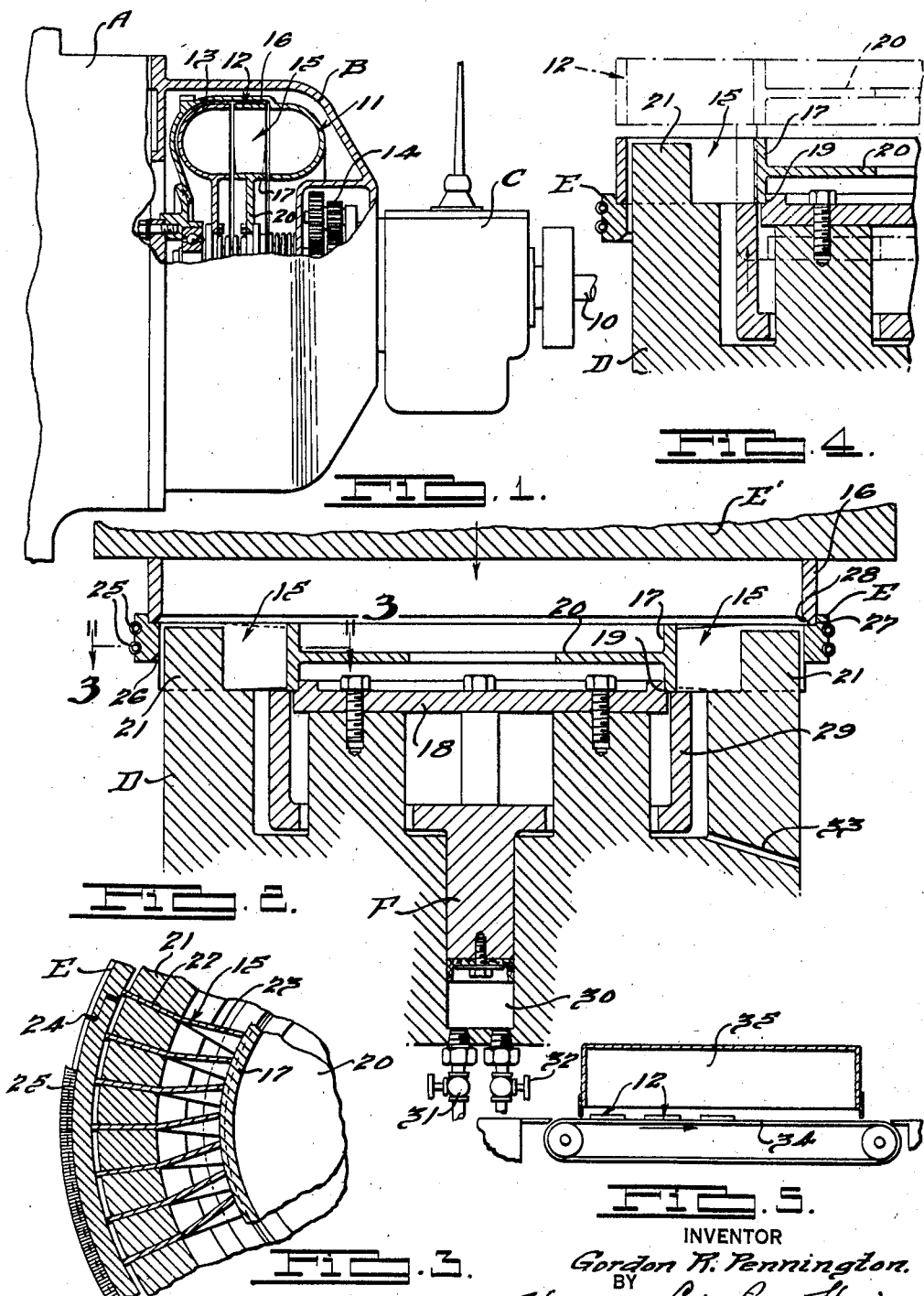

2,345,285

UNITED STATES PATENT OFFICE 2,345,285

APPARATUS FOR FABRICATING FLUID COUPLINGS

Gordon R. Pennington, Bloomfield Hills, Mich., assignor to Chrysler Corporation, Highland Park, Mich., a corporation of Delaware Original application May 12, 1941, Serial No. 393,057. Divided and this application October 20, 1941, Serial No. 415,712

4 Claims. (Cl. 29—23.5)

This invention relates to fluid drive-transmission and refers more particularly to improvements in apparatus for manufacture of fluid coupling structures.

This application is a division of my copending application Serial No. 393,057, filed May 12, 1941.

One object of my invention is to provide an improved apparatus for fabricating a fluid coupling structure particularly in connection with the assembly of the coupling vanes between inner and outer supports.

Another object is to provide improved apparatus for use in fabricating a fluid coupling structure preparatory to welding or brazing the component assembled parts.

Another object is to provide improved apparatus for fabricating fluid coupling structures having warped vane portions.

A further object is to provide an apparatus for the manufacture of a coupling structure having its vanes under constant stress, preferably compressive between their supports.

Further objects and advantages of my invention will be more apparent as this specification progresses, reference being had to the accompanying drawing in which:

Fig. 1 is a sectional elevational view of a power transmitting system, parts being broken away to illustrate the fluid coupling.

Fig. 2 is a sectional elevational view of apparatus for the assembly of the coupling structure and illustrating the initial steps in the fabrication of such structure.

Fig. 3 is a detail sectional plan view taken as indicated by line 3—3 of Fig. 2.

Fig. 4 is a view of a portion of the Fig. 2 apparatus shown in another position and illustrating further step in the fabrication method.

Fig. 5 is a diagrammatic sectional elevational view illustrating the hydrogen brazing apparatus.

Referring to the drawing, I have illustrated a portion of a motor vehicle drive system generally similar to that forming the subject of the copending application of Carl Breer and myself, Serial No. 390,302, filed April 25, 1941, wherein engine A transmits its drive through fluid coupling B and thence through transmission C to the usual propeller shaft 10. As more particularly set forth in said copending application, the coupling B is of the multi-stage type having coaxial relatively rotatable vaned impeller structure 11 and vaned primary and secondary runner structures 12 and 13 respectively. At times the runner 12 drives transmission C through torque multiplying gearing 14 and at other times during normal cruising the structures 11, 12 and 13 rotate in unison except for a small amount of slip inherent in such devices.

The runner 12 is of the type in which its vanes 15 define passages therebetween which are open axially in opposite directions toward structures 11 and 13. With such runners there is considerable difficulty in fabricating the vanes and in assembling the same with the outer and inner vane-connected vane-carriers or annuli 16 and 17, respectively, especially in making a resulting assembly which has the desired rigidity to maintain its form and balance during operation.

Referring to Fig. 2, I provide an assembly apparatus comprising a main fixed support table D having a fixture 18 shouldered at 19 to locate the hub 20 thereon, this hub carrying the inner annulus 17. Carried by the table, either integrally or by separate fixture, are the upstanding fingers 21 spaced circumferentially around the table to receive the outer end portions 22 of vanes 15 in the desired relatively spaced positions. The inner end portions 23 are preferably warped relative to portions 22 and terminate in contact with annulus 17.

In the initial fabrication, the operator places hub 20 in the Fig. 2 position and inserts vanes 15 between the spaces of fingers 21 as in Fig. 3, the vanes being supported horizontally by the upper face of table D. Then clamp ring E is applied downwardly, this ring being formed in a plurality of segments connected by circumferential clearance, as at 24, Fig. 3, with the component parts contracted radially by annular tension springs 25. The inner face of ring E adjacent its bottom edge is cut-back or bevelled at 26 so that it will not jam with the vanes 15 and to assist in guiding the ring into position exerting radial inward compression on the vanes. The arrangement is such that predetermined pressure is applied to each vane, as from 5 to 15 pounds as desired.

The ring E is forced down by any suitable power device, such as the ram E', preferably acting through the outer annulus 16 which seats in an annular locating shoulder 27 of ring E. The ring 16 has its inner bottom edge bevelled at 28 for functioning in a manner similar to the bevel 26. This ring 16 is preferably of slightly less diameter than ring E when the latter is in the Fig. 2 position so that ring 16 exerts a further radial compression on vanes 15 when ring 16 is forced downward into its final position of Fig. 4. At this time the ring E is pushed down free of the vanes 15 and the assembled runner 12 is now ready for removal from table D.

For releasing the runner 12 I have provided a fluid pressure operated piston F having the upstanding annular flange 29 which, when oil pressure is admitted to chamber 30 under control of valve 31, moves upwardly to act against ring 17 and vanes 15 to move the assembled runner 12 clear of table D as indicated in Fig. 4.

To restore piston F ready for the assembly of another runner, valve 31 is closed and the relief valve 32 is opened to allow the pressure fluid in chamber 30 to escape. Any fluid escaping upwardly beyond piston F drains off at passage 33.

The ring E and springs 25 are arranged so that on assembly of this ring as in Fig. 2, all slack in the vanes 15 is taken up and a predetermined radial compression of the order of 5 to 15 pounds by way of example is put on each vane. When the ring 16 is assembled, an additional radial pressure is imposed on the vanes sufficient to compensate for any production variations and to insure engagement of all vanes with ring 16. From two to eight thousandths of an inch on the inside diameter of ring 16 less than the diameter of ring E when in the Fig. 2 position should ordinarily be adequate. The rings E and 16 therefore exert progressive or stage pressures on vanes 15 and in the final assembly of the runner 12 of the vanes 15 are under compression. The warped vane portions 23, apart from improving the efficiency of the coupling as set forth in said copending application, serve to impart rigidity to the vanes.

After removal of the assembled runner from table D, the assemblies are preferably hydrogen brazed or welded according to well known commercial methods. In Fig. 5 I have diagrammatically illustrated the runners 12 travelling slowly on the continuous belt 34 while subjected to the usual hot atmosphere of hydrogen at 35 for causing the vanes 15 to fuse with rings 16 and 17 by reason of copper previously applied at these points. This process is well known and need not be set forth in detail herein.

If desired, the ring 17 may be forced into position instead of ring 16 by the same assembly steps, in which case the ring 16 will, of course, be first installed on table D and rings E and 17 will be arranged to act expansively as will be obvious.

Because of the relatively high temperature ordinarily used for commercial hydrogen brazing, around 2100° F. where copper flux is employed, the compressive stress applied to vanes 15 to hold them in position for the brazing process will largely disappear when the brazed assembly is allowed to cool but sufficient compressive stress will remain in the final assembly to supplement the brazed attachment of the vanes to the rings 12 and 17 so as to assist in holding the vanes and rings against relative displacement. The extent of final or residual stress in the vanes may, of course, be varied to some extent by the amount of initial stress applied to the vanes.

I claim:

1. Apparatus for fabricating a multi-vaned rotatable fluid power-transmitting structure of the type having a pair of vane-connected carriers disposed in relatively spaced relation one within the other, comprising, a support structure, means carried by said support structure for receiving one of said carriers in fixed position, means for locating said vanes in circumferentially spaced relation with respect to each other with one end of said vanes generally radiating from said one carrier, a yielding annulus structure adapted to engage said radiating ends of said vanes for stressing the vanes in a direction toward said one carrier, and means for coincidentally displacing said yielding annulus structure from said radiating vane ends and applying the other of said carriers into position concentrically with respect to said one carrier while maintaining said vanes stressed by said yielding annulus structure.

2. Apparatus for fabricating a multi-vaned rotatable fluid power-transmitting structure of the type having a pair of vane-connected carriers disposed in relatively spaced relation one within the other, comprising, a support structure, means carried by said support structure for receiving one of said carriers in fixed position, means for locating said vanes in circumferentially spaced relation with respect to each other with one end of said vanes generally radiating from said one carrier, a yielding annulus structure adapted to engage said radiating ends of said vanes for stressing the vanes in a direction toward said one carrier, and means for applying the other of said carriers axially of said power-transmitting structure into position concentrically with respect to said one carrier, said yielding annulus structure being adapted to receive thrust from said applying means through said other carrier such that the latter acts on said yielding annulus structure to displace this structure axially from engagement with said radiating vane ends during said positioning of said other carrier.

3. Apparatus according to claim 1, wherein, said yielding annulus structure has a vane-engaging portion thereof bevelled to facilitate stress-producing engagement of this structure with said vanes.

4. Apparatus for fabricating a multi-vaned rotatable fluid power-transmitting structure of the type having a pair of vane-connected carriers disposed in relatively spaced relation one within the other, comprising, a support structure, means carried by said support structure for receiving one of said carriers in fixed position, a plurality of relatively spaced circumferentially disposed fingers projecting from said support structure into position concentric with respect to said one carrier, said fingers being so spaced apart as to receive therebetween one of said vanes with an end of each vane engaged with said one carrier, a yielding annulus structure having a seat for receiving the other of said carriers in thrust-transmitting relation, and means comprising a plunger adapted to have a stroke for applying said other carrier into position concentrically with said one carrier and engaging the opposite ends of said vanes under compressive stress-application thereto, said yielding annulus structure being so disposed, relative to said plunger and said other carrier, such that this carrier acts, during said plunger stroke, to displace said yielding annulus structure first into a position for radially stressing said vanes and then into a position free from said vanes.

GORDON R. PENNINGTON.